(12) United States Patent
Tomioka (10) Patent No.: US 7,876,429 B2
(45) Date of Patent: Jan. 25, 2011

(54) METHOD AND APPARATUS AS WELL AS CORRECTIVE OPTICAL SYSTEM FOR EVALUATING RESTORATION-PREMISED LENS

(75) Inventor: Ryoko Tomioka, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/175,346

(22) Filed: Jul. 17, 2008

(65) Prior Publication Data

US 2009/0040510 A1    Feb. 12, 2009

(30) Foreign Application Priority Data

Aug. 7, 2007 (JP) .......................... P2007-205130

(51) Int. Cl.
 *G01B 9/00* (2006.01)
 *G01M 11/00* (2006.01)
(52) U.S. Cl. .................... 356/124; 356/124.5; 356/125
(58) Field of Classification Search ................. None
See application file for complete search history.

(56) References Cited

U.S. PATENT DOCUMENTS

| | | | | | |
|---|---|---|---|---|---|
| 3,574,464 | A | * | 4/1971 | Howland | 356/126 |
| 3,841,760 | A | * | 10/1974 | Guyton | 356/124 |
| 4,070,115 | A | * | 1/1978 | Humphrey | 356/125 |
| 5,221,834 | A | * | 6/1993 | Lisson et al. | 250/201.9 |
| 5,341,312 | A | * | 8/1994 | Lisson et al. | 359/223.1 |
| 6,515,809 | B2 | * | 2/2003 | Kohno | 359/736 |
| 6,900,831 | B2 | * | 5/2005 | Nishiwaki | 348/208.5 |
| 6,940,649 | B2 | * | 9/2005 | Dowski, Jr. | 359/558 |
| 7,215,493 | B2 | * | 5/2007 | Olmstead et al. | 359/793 |
| 7,365,917 | B2 | * | 4/2008 | Zalevsky | 359/738 |
| 7,436,595 | B2 | * | 10/2008 | Cathey et al. | 359/558 |
| 7,580,620 | B2 | * | 8/2009 | Raskar et al. | 396/55 |

(Continued)

FOREIGN PATENT DOCUMENTS

JP    2000-275582 A    10/2000

(Continued)

OTHER PUBLICATIONS

Cathey et al., Applied Optics, vol. 41, No. 29, pp. 6080-6092, Oct. 10, 2002.

(Continued)

*Primary Examiner*—Tarifur Chowdhury
*Assistant Examiner*—Gordon J Stock, Jr.
(74) *Attorney, Agent, or Firm*—Birch, Stewart, Kolasch & Birch, LLP (57) ABSTRACT

The evaluating apparatus evaluates a restoration-premised lens which is employed in an image forming system that converts an optical image into an electronic image and then enforces a restoration processing on the electronic image in order to obtain a sharp image, is actually manufactured based on such design as premised on the restoration processing. The evaluating apparatus includes an evaluating corrective optical system, measuring section and evaluating section. The evaluating corrective optical system, when it is combined with a lens manufactured just as designed, forms a sharp optical image. The measuring section measures the optical characteristics of a composite optical system provided by combining together the evaluating corrective optical system and the manufactured lens. The evaluating section evaluates the manufactured lens according to measured results provided by measuring section.

13 Claims, 4 Drawing Sheets

U.S. PATENT DOCUMENTS

| | | | |
|---|---|---|---|
| 7,756,407 B2 * | 7/2010 | Raskar | 396/55 |
| 2001/0055111 A1 * | 12/2001 | Yoda et al. | 356/127 |
| 2005/0204329 A1 * | 9/2005 | Pauca et al. | 716/21 |
| 2007/0146689 A1 * | 6/2007 | Araki et al. | 356/124.5 |
| 2007/0236573 A1 * | 10/2007 | Alon et al. | 348/207.99 |
| 2007/0268376 A1 * | 11/2007 | Yoshikawa et al. | 348/222.1 |
| 2008/0165261 A1 * | 7/2008 | Kamo | 348/240.3 |
| 2008/0198482 A1 * | 8/2008 | Zalevsky | 359/738 |

FOREIGN PATENT DOCUMENTS

| | | |
|---|---|---|
| JP | 3275010 B2 | 2/2002 |
| JP | 2006-519527 A | 8/2006 |
| JP | 2007-060647 A | 3/2007 |
| WO | WO-96/24085 A1 | 8/1996 |
| WO | WO-2004/063989 A3 | 7/2004 |
| WO | WO-2004/090581 A2 | 10/2004 |

OTHER PUBLICATIONS

Dowski et al., Applied Optics, vol. 34, No. 11, pp. 1859-1866, Apr. 10, 1995.

Van Der Gracht, Joseph et al. "Aspheric optical elements for extended depth of field imaging." SPIE vol. 2537 pp. 279-287. XP-002114536.

* cited by examiner

METHOD AND APPARATUS AS WELL AS CORRECTIVE OPTICAL SYSTEM FOR EVALUATING RESTORATION-PREMISED LENS

CROSS-REFERENCE TO RELATED APPLICATIONS

This application is based on and claims priority under 35 USC 119 from Japanese Patent Application No. 2007-205130 filed Aug. 7, 2007; the entire contents of which are incorporated herein by reference.

BACKGROUND

1. Technical Field

The present invention relates to method and apparatus as well as a corrective optical system respectively for evaluating a restoration-premised lens and, specifically, the invention relates to such method and apparatus as well as a corrective optical system respectively for evaluating a lens which is premised on a restoration processing for extending the depth of focus of this lens. Referring further to this lens, owing to execution of such restoration processing, the lens is designed such that it is forced not to form an image and, specifically, in a high frequency range, the depth of the MTF (Modulation Transfer Function) thereof is decreased to thereby provide an image as if it is blurred; and, the lens is actually manufactured according to this design.

2. Related Art

Recently, there has been remarkably advanced a technology which converts an optical image obtained by an optical system to an electronic image, imports the electronic image as image data, and enforces an image processing on the image data to thereby obtain a desired image. With use of this technology, even when a blur image is obtained by an optical system having a poor image quality, the image processing can be executed to the blur image and finally a sharp image can be obtained from the blur image. Thus, there has been developed an optical system which is premised on such restoration processing that can provide a sharp image.

Figure 8:
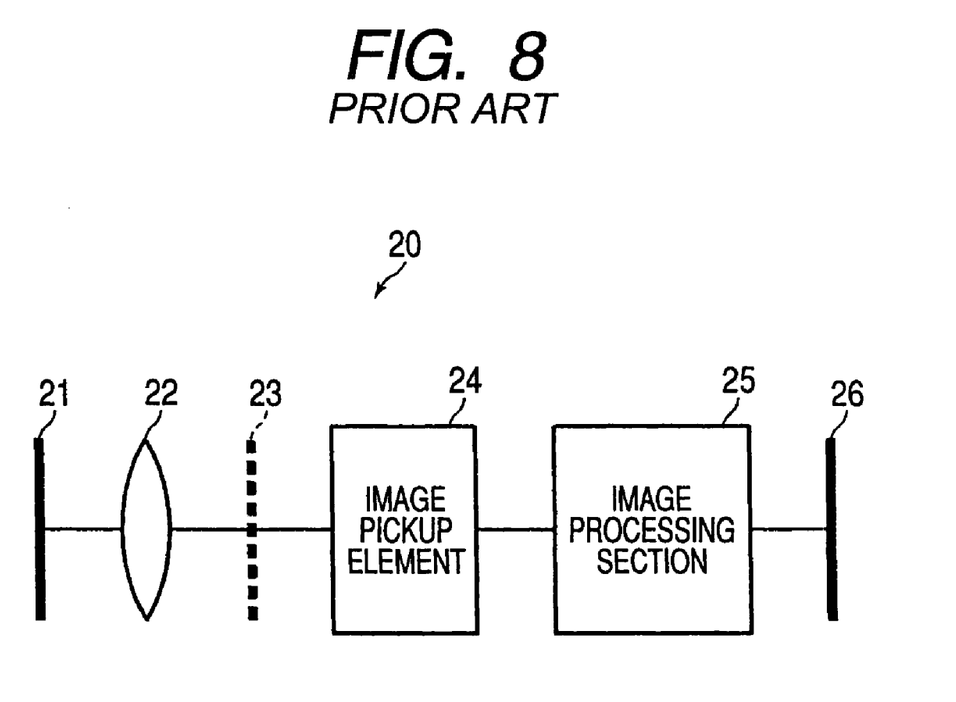
FIG. 8 is a general structure view of an image forming system including a restoration processing.

In non-patent reference 1 (W. Thomas Cathey and Edward R. Dowski, "New paradigm for imaging systems", APPLIED OPTICS/Vol. 41, No. 29/10 Oct. 2002) and non-patent reference 2 (Edward R. Dowski, Jr., and W. Thomas Cathey, "Extended depth of field through wave-front coding", APPLIED OPTICS/Vol. 34, No. 11/10 Apr. 1995) as well as in the below-mentioned patent reference 1 (WO-A2-2004/090581), patent reference 2 (JP-B-3275010 corresponding to WO-A1-96/24085), patent reference 3 (JP-A-2000-275582), patent reference 4 (JP-A-2007-60647) and patent reference 5 (JP-A-2006-519527), there is disclosed a system which forms an image using the above-mentioned technology. FIG. 8 shows the general structure of this system 20. In the system 20 shown in FIG. 8, the image 23 of an object 21 is formed by an optical system 22. This optical system 22 is structured such that, differently from a conventional imaging optical system, forms an blur image having a given amount of blur even at the image forming position of a so called conventional optical system; and thus, the image provides a blurred image. That is, the optical system 22 is structured such that, as will be described later, it forms an image premised on such restoration processing that is executed by an image processing portion 25. A lens system having such property as the optical system 22 will be hereinafter referred to as a lens premised on restoration processing (which is also abbreviated to a restoration-premised lens).

An image pick up element 24 picks up this blurred image 23, converts it to an electric signal and transmits the thus-converted electric signal to the image processing portion 25. The image processing portion 25 enforces such a restoration processing as reconstructs the blurred image into an image having the intensity distribution of an image in focus using a digital filter, thereby forming a sharp image 26.

In the non-patent reference 1 and 2 and the patent reference 1 to 4, there is disclosed a field depth extending system which extends the depth of field by applying the above system 20; and, a lens premised on a restoration processing to be enforced by this system 20 is designed such that it extends its depth of field.

In the non-patent reference 1 and 2 and patent reference 2 to 4, there is disclosed a lens system into which, as a lens premised on the above restoration processing, a mask for demodulating a phase distribution is inserted to the pupil position of a conventional imaging lens (which is hereinafter referred to as a pupil demodulation type mask).

On the other hand, in the patent reference 5, there is disclosed a lens system which does not employ the pupil demodulation type mask as a lens premised on the restoration processing but generates such an aberration on purpose that forms a blurred image (which is hereinafter referred to as an aberration additional type lens system).

However, in a pupil modulation type image system disclosed in the non-patent reference 1, since there is used a mask having a rotation asymmetry with respect to an optical axis, there is found a disadvantage that the performance of the system can be varied sensitively with respect to the rotation around the optical axis. Owing to this, in order to obtain a sharp image, the position of the mask with respect to the rotation around the optical axis must be strictly matched to the direction of an image processing which corresponds to the mask. Also, in the pupil demodulation type lens system, due to the increased number of parts, unfavorably, the cost of the lens system increases.

On the other hand, the aberration additional type lens system does not require the use of a mask and also can be structured such that it is has rotation symmetry with respect to an optical axis. From these viewpoints, this lens system is preferable. However, in the case of the aberration additional type lens system, even when it can be manufactured as designed, there can be obtained only blurred images at all positions. This makes it difficult to regard it as an imaging optical system which is capable of specifying an image forming position. Therefore, in the evaluating step thereof, it cannot employ evaluating method and apparatus which are based on the image forming position that is used in the evaluation of a conventional imaging optical system.

To evaluate the aberration additional type lens system, using such structure as shown in FIG. 8, a blurred image must be once converted to an electric signal to thereby obtain image data, an image processing must be enforced on the thus obtained image data, and the image after execution of the image processing must be evaluated. However, this method takes much time and cost and, therefore, this method is not able to cope with the mass production of the lens systems. Also, when the image processing methods are different, there is generated a difference between images obtained after execution of the image processing, which makes it impossible to evaluate the performance of only the optical systems.

The present invention aims at solving the problems found in the above-mentioned related art. Thus, it is an object to provide restoration-premised lens evaluating method and apparatus which can evaluate the performance of only an optical system including even an aberration additional type of restoration-premised lens using a general-purpose technique similarly to a conventional imaging optical system, and an evaluating corrective optical system for use such evaluation.

SUMMARY

[1] According to an aspect of the invention, a method for evaluating a restoration-premised lens which is employed in an image forming system that (i) converts an optical image into an electronic image and (ii) enforces a restoration processing on the electronic image so as to obtain a sharp image, the restoration-premised lens which is manufactured such that the restoration processing is to be enforced on the electronic image, the method includes: preparing a evaluating corrective optical system that, when combined with the restoration-premised lens, forms a sharp optical image; measuring an optical characteristics of a composite optical system that includes the evaluating corrective optical system and the restoration-premised lens; and evaluating the restoration-premised lens based on the measured optical characteristics.

[2] According to another aspect of the invention, an apparatus for evaluating a restoration-premised lens which is employed in an image forming system that (i) converts an optical image into an electronic image and (ii) enforces a restoration processing on the electronic image in order to obtain a sharp image, the restoration-premised lens which is manufactured such that the restoration processing is to be enforced on the electronic image, the apparatus includes an evaluating corrective optical system, a measuring section and an evaluating section. The evaluating corrective optical system, when combined with a lens according to the design, forms a sharp optical image. The measuring section measures an optical characteristics of a composite optical system that includes the evaluating corrective optical system and the restoration-premised lens. The evaluating section evaluates the restoration-premised lens based on a measured result obtained by the measuring section.

[3] Further, according to still another aspect of the invention, an evaluating corrective optical system is an optical system for evaluating a restoration-premised lens which is employed in an image forming system that (i) converts an optical image into an electronic image and (ii) enforces a restoration processing on the electronic image so as to obtain a sharp image. The restoration-premised lens is manufactured such that the restoration processing is to be enforced on the electronic image. The evaluating corrective optical system, when combined with the lens according to the design, forms a sharp optical image.

Here, the restoration-premised lens according to the invention is not limited to a system which is composed of only one or more lenses, but may also be a system which includes other optical elements than the lenses, for example, a diffractive optics, a reflecting element, a phase distribution modulation element, and an intensity distribution modulation element.

And, the evaluating corrective optical system according to the invention may use not only a conventional refraction type lens but also a refraction index distribution type lens or a diffractive optics. Also, the present evaluating corrective optical system is not limited to the lens but may also use other optical elements such as a phase distribution modulation element (e.g. a liquid crystal lens). Further, it may also be a reflecting optical system, an eccentric optical system, a rotation asymmetry optical system, or the like; and, it may also be composed by combining together two or more of these optical systems.

Here, a position, where the evaluating corrective optical system is arranged, may be disposed on the object side of the lens premised on restoration processing or on the image side thereof; or, the evaluating corrective optical system may be inserted into the lens premised on restoration processing; or, it may be disposed at two or more positions.

Also, the evaluating corrective optical system may, when combined with the restoration-premised lens manufactured according to the design thereof, forms a sharp optical image. The focal length of the restoration-premised lens may be different from the composite focal distance of the composite optical system which is provided by combining the evaluating corrective optical system with the restoration-premised lens.

Here, a composite system provided by combining a lens according to the design thereof with the evaluating corrective optical system, preferably, may have a high image quality and, more preferably, may vary in the performance sensitively to the error of the restoration-premised lens.

Also, the arrangement of the evaluating corrective optical system and the manufactured lens when they are combined together is to be similar to the arrangement of the evaluating corrective optical system and the lens according to the design thereof when they are combined together.

Here, as the restoration processing, there can be used known method such as a Wiener filter and a kernel Wiener filter.

Here, the optical characteristics means lens spec, image qualities and the like; and, specifically, a focal length, an F-number, relative illuminations, a distortion, a chromatic aberration, an MTF, a wave front aberration, and the like.

The evaluating corrective optical system is configured to, when it is combined with the restoration-premised lens manufactured according the design thereof, form a sharp optical image. Therefore, a composite optical system, which is provided by combining the evaluating corrective optical system with the manufactured restoration-premised lens, can be regarded as an image forming optical system which can form a substantially sharp optical image. That is, by using the evaluating corrective optical system, there can be structured an image forming optical system including a restoration-premised lens.

And, according to method or apparatus for evaluating a restoration-premised lens of [1], [2] or [3], even when the restoration-premised lens is of an aberration additional type lens, by using the composite optical system, the optical characteristics of the lens based on the image forming positions can be measured by use of measuring method and apparatus which are similarly used in a conventional imaging optical system, which makes it possible to evaluate the performance of only the optical system without using an image processing.

DETAILED DESCRIPTION

Figure 1:
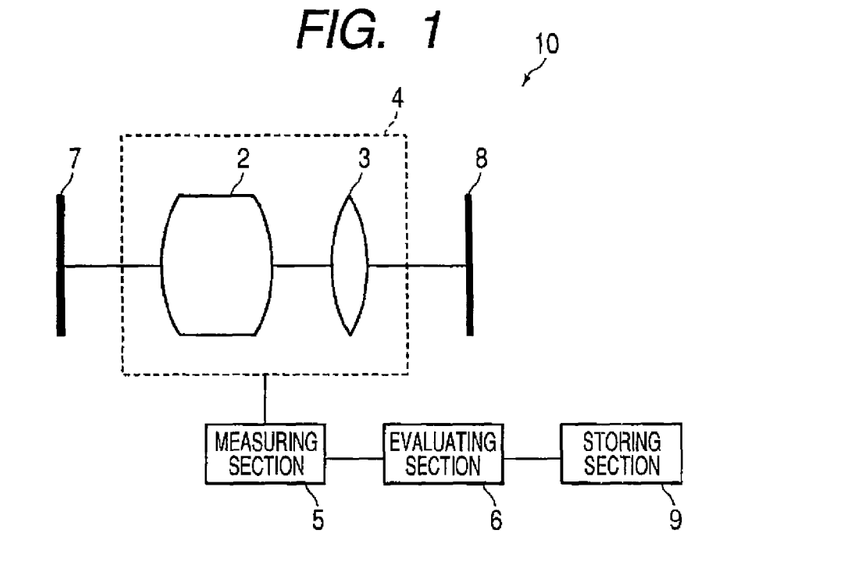
FIG. 1 is a view of a general structure of an evaluating apparatus for evaluating a lens premised on restoration processing according to an embodiment of the invention.

Now, description will be given below in detail of an embodiment according to the invention with reference to the accompanying drawings. Specifically, FIG. 1 is a block diagram of the general structure of an evaluating apparatus 10 according to an embodiment of the invention. The evaluating apparatus 10 is used to evaluate a restoration-premised lens which, for use in such an image forming system that converts an optical image into an electronic image and then enforces a restoration processing on the thus converted electronic image in order to obtain a sharp image, is actually manufactured according to such design that is premised on the above-mentioned restoration processing.

Figure 2:
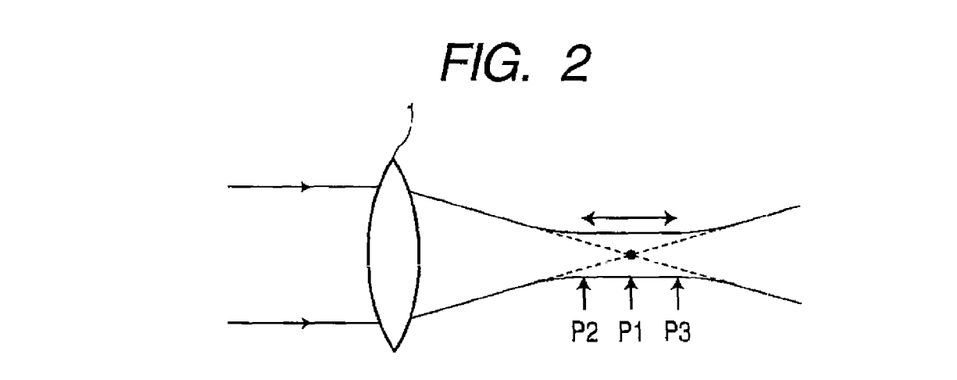
FIG. 2 is a view to show how lights are collected by a lens premised on restoration processing.

Firstly, description will be given below of the property of the restoration-premised lens according to the invention with reference to FIGS. 2 to 4. FIG. 2 is a typical view to show how parallel rays incident on a restoration-premised lens 1 manufactured as designed are collected. Also, FIG. 3 is a typical view to show how parallel rays incident on a conventional imaging optical system 101 are collected.

Figure 3:
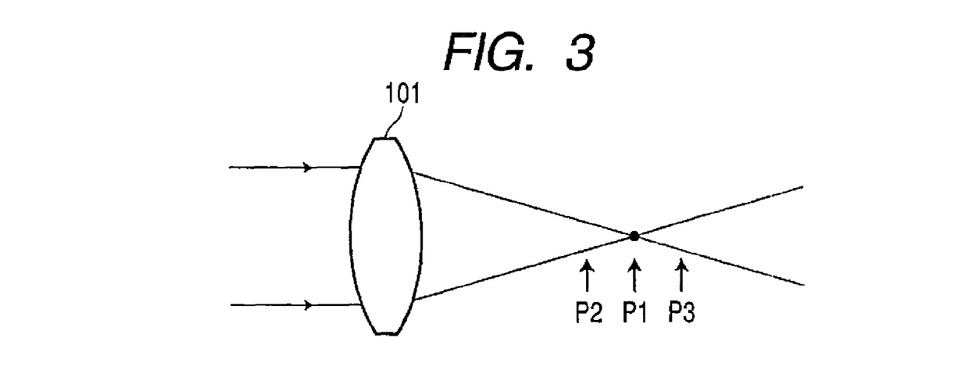
FIG. 3 is a view to show how lights are collected by a conventional imaging optical system.

In the conventional imaging optical system 101, as shown in FIG. 3, the lights are collected substantially at one point in the position P1 of the focal point of the optical system 101. On the other hand, in the restoration-premised lens 1, as shown in FIG. 2, the lights are not collected at one point even in the position P1 that corresponds to the focal position of the lens 1, so that a sharp image will never be formed in any positions. Here, the position P1 shown in FIG. 2 is an intersection point where the edge lines form envelope of rays existing in the vicinity of the focal position and extending in a diagonal line direction are connected to each other.

Instead, in the restoration-premised lens 1, there is kept a substantially constant envelope of luminous flux diameter in a wide range shown by two arrow marks in FIG. 2, that is, in a wide range which contains the position P1 and extends from a position P2 to a position P3 respectively existing before and after the position 1. On the other hand, in the conventional imaging optical system 101 shown in FIG. 3, the luminous flux diameter of the position P1 is greatly different from the luminous flux diameters of positions P2 and P3 which are distant from the position P1 as equally as in FIG. 2.

That is, when compared with the conventional imaging optical system 101, the restoration-premised lens 1 does not form a sharp image but has such property that its MTF values hardly vary with respect to a defocus.

Figure 4:
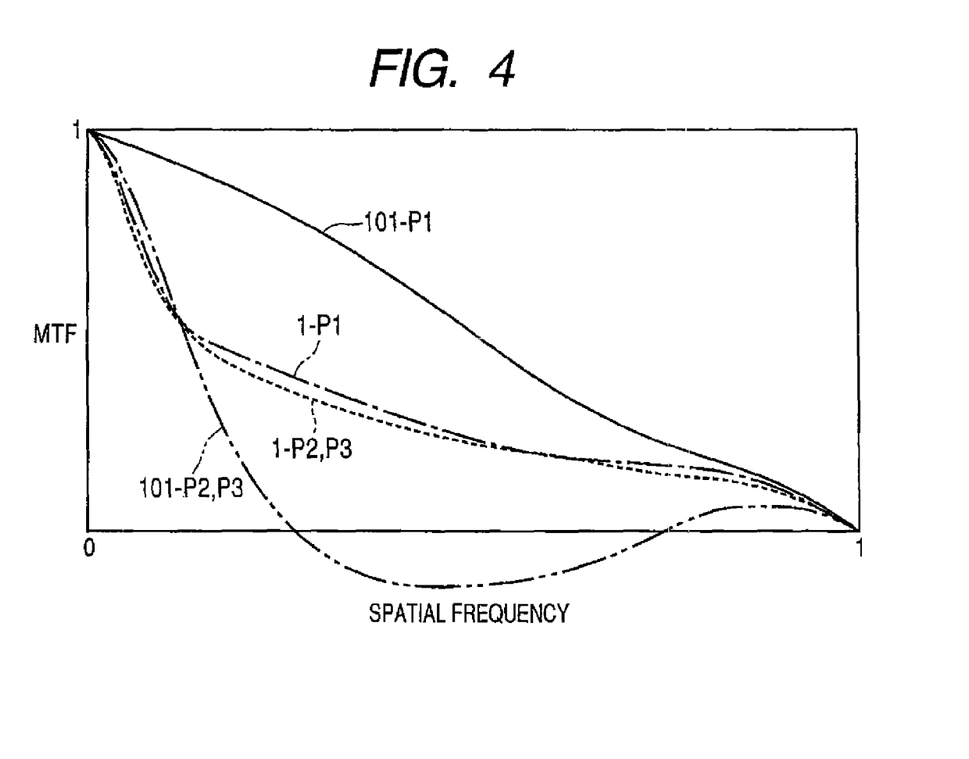
FIG. 4 is a typical view of the MTF curves of a lens premised on restoration processing and the MTF curves of a conventional imaging optical system.

FIG. 4 shows not only the MTF of (a sign 1-P1) of the restoration-premised lens 1 in the position P1 thereof and the MTF curves (signs 1-P2, P3) of the lens 1 in the positions P2 and P3 thereof, but also the MTF (a sign 101-P1) of the conventional imaging optical system 101 in the position P1 thereof and the MTF curves (signs 101-P2, P3) of the system 101 in the positions P2, P3 thereof. In FIG. 4, the horizontal axis expresses a normalized spatial frequency, whereas the vertical axis expresses the MTF curves.

As shown in FIG. 4, in the conventional imaging optical system 101, the MTF in the position P1, which is a focal position, provides a high value, whereas the MTF curves in the positions P2 and P3, which are defocus positions, provide extremely low values and further, some portions of the MTF curves in the positions P2 and P3 have zero and negative values. An area, where the MTF has a negative value, provides a phase reversed state in which it is 180 degrees out of phase; and, in such area, there occurs a phenomenon which is called spurious resolution. The spurious resolution means such information that apparently seems to be resolved but is actually false information; for example, in the case of an object which is white and black, there is seen an image in such a state where the white and black are reversed.

On the other hand, in the restoration-premised lens 1, as shown in FIG. 4, although the MTF in the position P1 thereof provides a low value, the MTF curves in the positions P2 and P3 thereof, which correspond to the defocus positions in the conventional imaging optical system, provide substantially the same values as the value in the position P1, whereby no spurious resolution can occur. Therefore, although there is obtained a blurred image, no false information can be provided.

The present restoration-premised lens 1 is used in such an image forming system as shown in FIG. 8 that enforces an image processing on a blur image obtained by the restoration-premised lens 1 to thereby form a sharp image. Also, the restoration-premised lens 1 according to the present embodiment is an aberration additional type lens which has been described above in the article "Related Art" in the present specification. The kinds of the additional aberrations and the values thereof are designed while the technique of the image processing for processing the blurred image is also taken into account.

However, in a general mass production process, it is difficult to manufacture a lens which is designed according to a complete design value and thus, actually, there is manufactured a lens having a property which is near to the design value. The evaluation apparatus 10 is an apparatus which evaluates how near a lens, which is premised on the restoration processing and is actually manufactured according to the above design (which is hereinafter referred to as a sample lens 3), is to the design value.

The evaluation apparatus 10 includes an evaluating corrective optical system 2, measuring section 5 that measures the optical characteristics of a composite optical system 4 which is provided by combining together the evaluating corrective optical system 2 and sample lens 3, and evaluating section 6 that evaluates the sample lens 3 based on the results of measurements made by the measuring section 5.

The evaluating corrective optical system 2 is a system which not only has such an aberration as can cancel a residual aberration owned by a restoration-premised lens manufactured just as designed, but also, when it is combined with the restoration-premised lens manufactured just as designed, the composite optical system 4 can form a sharp optical image.

Figure 5:
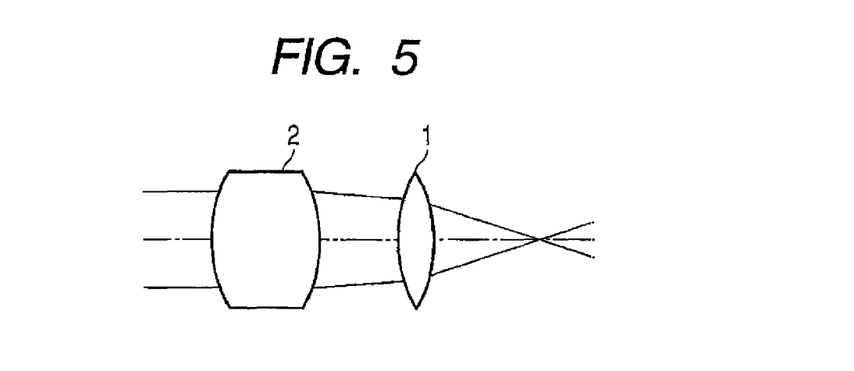
FIG. 5 is a view to show how lights are collected by an optical system provided by combining together an evaluating correcting optical system and a restoration-premised lens manufactured just as designed.
Figure 6:
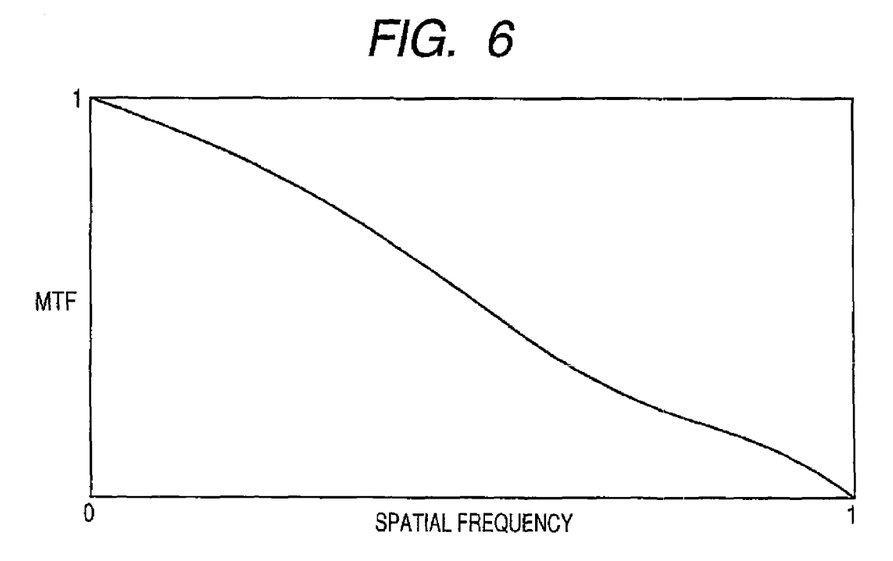
FIG. 6 is a typical view of MTF curves at the image forming position of an optical system provided by combining together an evaluating correcting optical system and a restoration-premised lens just manufactured as designed.

FIG. 5 is a typical view to show how parallel rays (emitted from object located at infinity), which have entered an optical system provided by combining together the evaluating corrective optical system 2 and the restoration-premised lens 1 manufactured just as designed, are gathered. The transmitted lights are collected at a point to thereby form a sharp image. FIG. 6 is a typical view of the MTF curves obtained at the image forming positions of the optical system provided by combining together the evaluating corrective optical system 2 and the restoration-premised lens 1 manufactured just as designed. The MTF curves shown in FIG. 6 have high values similar to those of the conventional imaging optical system.

As described above, since the restoration-premised lens is alone unable to form a sharp image, the lens fundamentals and image quality thereof based on the image forming position thereof cannot be measured. However, by combining the restoration-premised lens with the evaluating corrective optical system 2, an image forming optical system can be constructed, thereby being able to measure the basic constants and image quality thereof. Also, since the sample lens 3 has a performance almost similar to that of the restoration-premised lens 1 manufactured just as designed, the composite optical system 4 provided by combining together the sample lens 3 and the evaluating corrective optical system 2 can be regarded as an image forming optical system. That is, a sharp optical image 8 of an object 7 can be formed by the composite optical system 4.

The evaluating corrective optical system 2, when the design value of the restoration-premised lens 1 is known, can be designed easily according to a known method using existing optical design software. And, when the composing parts of the evaluating corrective optical system 2 are manufactured with high precision according to strict allowances, it is possible to provide the evaluating corrective optical system 2 that has an almost desired performance.

Here, the optical system, which is provided by combining together the restoration-premised lens 1 manufactured just as designed and the evaluating corrective optical system 2, preferably has a very high image quality; and thus, when designing the evaluating corrective optical system 2, preferably, the evaluating corrective optical system 2 may be optimized for this purpose. In this case, when evaluating a plurality of sample lenses 3, it can be determined that a sample lens constituting a composite optical system 4 having the highest image quality is nearest to the design value. Also, when, after construction of the composite optical system 4, the sample lens 3 is adjusted such that the image quality thereof becomes high, the sample lens 3 can be made to be near to the design value.

The evaluating corrective optical system 2 may be formed of an ordinary spherical lens or may also be formed of an aspherical lens or a lens using a free-form surface. Or, it is not limited to a lens but it may also be formed of a diffractive optics, a phase modulation element or the like.

In FIG. 1, the evaluating corrective optical system 2 is disposed on the object side of the sample lens 3. However, it may also be disposed on the image side of the sample lens 3 or in the sample lens 3, or it may also be structured such that it can be disposed at a plurality of positions. The position of the evaluating corrective optical system 2 can be set when it is designed.

Referring to the measuring section 5, in order that the position relationship between the evaluating corrective optical system 2 when it is designed and the restoration-premised lens 1 can be the same as the position relationship between the evaluating corrective optical system 2 and the sample lens 3, the measuring section 5 includes a placement base (not shown) on which the evaluating corrective optical system 2 and sample lens 3 can be placed. The placement base for placing the sample lens 3 thereon, preferably, may be structured such that the sample lens 3 can be replaced easily.

The measuring section 5, except for the placement base, can employ a structure basically similar to a conventional measuring apparatus for measuring the optical characteristics of a conventional image forming optical system. As the optical characteristics to be measured by the measuring section 5, there are available the image quality and lens spec of an optical system; and, specifically, the MTF, focal length, back-focus, F number, relative illuminations, distortion, chromatic aberration and the like. The measurement by the measuring section 5 may be carried out visually, or may be carried out by taking the optical image 8, which is obtained by the composite optical system 4, using an image pickup element (not shown).

The evaluating section 6 can be constructed by a computer system such as a personal computer. Data on optical characteristics based on the optical system provided by combining together the restoration-premised lens 1 just manufactured as designed and the evaluating corrective optical system 2 (optical characteristic data) may be stored in a storing section 9 which is incorporated in the evaluating section 6 or is connected externally thereto. And, by comparing such data with the measurement results of the optical characteristics of the composite optical system 4 obtained by the measuring section 5, the sample lens 3 may also be evaluated. Also, an allowance range based on the design optical characteristics data may also be previously set, and this allowance range may also be stored in the storing section 9.

Figure 7:
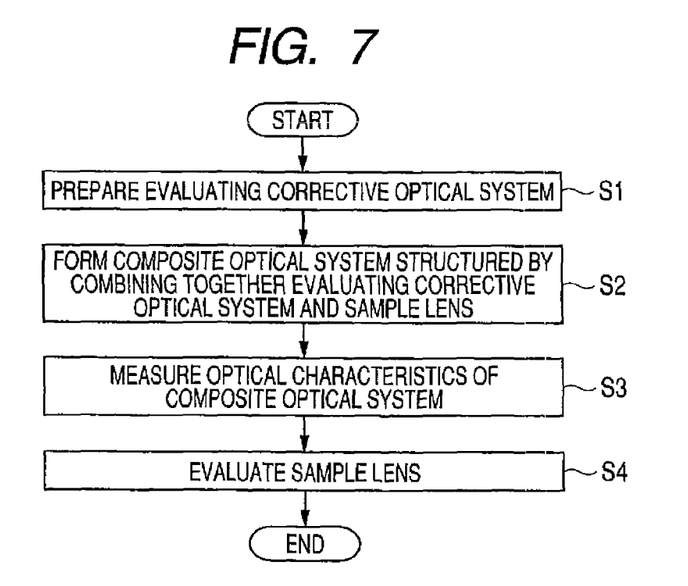
FIG. 7 is a flow chart of a method for evaluating a lens premised on restoration processing according to an embodiment of the invention.

Next, description will be given below of an example of a lens evaluating method according to the embodiment of the invention using the above-structured evaluating apparatus 10 with reference to FIG. 7. FIG. 7 is a flow chart of a method for evaluating a lens which is premised on a restoration processing according to the invention.

Firstly, there is prepared the evaluating corrective optical system 2, when it is combined with the restoration-premised lens 1 manufactured just as designed, forms a sharp image (Step S1). Next, the sample lens 3 and evaluating corrective optical system 2 are placed onto the placement base of the measuring section 5, and the composite optical system 4 which is structured by combining together the sample lens 3 and evaluating corrective optical system 2 is formed (Step S2).

And, the optical characteristics of the composite optical system 4 are measured using the measuring section 5 (Step S3). Finally, based on the measurement results obtained in Step S3, the sample lens 3 is evaluated (Step S4).

In the evaluating step to be executed in Step S4, for example, by comparing the measurement results with the design optical characteristics stored in the storing section 9, it is possible to evaluate to what degree the sample lens 3 is near to the design. Also, by referring to the allowance range stored in the storing section 9 and checking whether the measurement results are within the allowance range or not, the sample lens may be judged good or not.

As can be understood obviously from the foregoing description, according to the lens evaluating apparatus and method according to the present embodiment, the performance of even an aberration additional type lens premised on the restoration processing can be evaluated similarly to a conventional imaging optical system using conventional apparatus and method for evaluating the conventional imaging optical system; and thus, without carrying out an image processing, the performance of an optical system as a single part can be evaluated.

Although the invention has been described heretofore with reference to an embodiment thereof, the invention is not limited to the above-mentioned embodiment but various changes are also possible without departing from the subject matter of the invention.

For example, in the above-mentioned embodiment, by comparing the measured results with the designed optical characteristics data, the sample lens is evaluated. However, alternatively, while previously storing data on the evaluating corrective optical system 2 in the storing section 9, there may be carried out an operation in which the contributing portions of the evaluating corrective optical system 2 are subtracted from the measured results of the composite optical system 4.

This obtains the optical characteristics of the sample lens 3 and thus the sample lens 3 can be evaluated according to the thus-obtained optical characteristics.

Also, in the foregoing description, as an example of a lens premised on restoration processing, there has been used the aberration additional type lens that has been described in the article "Related Art" of this specification. However, the invention can also be applied to a pupil modulation type lens premised on restoration processing.

What is claimed is:

1. A method for evaluating a restoration-premised lens which is employed in an image forming system that (i) converts an optical image into an electronic image and (ii) enforces a restoration processing on the electronic image so as to obtain a sharp image, wherein the restoration-premised lens is manufactured according to a design such that the restoration processing is to be enforced on the electronic image, the method comprising:

preparing an evaluating corrective optical system designed according to the known design of the restoration-premised lens that, when combined with the restoration-premised lens according to the design, forms a sharp optical image;

measuring optical characteristics of a composite optical system that includes the evaluating corrective optical system and the restoration-premised lens; and evaluating the restoration-premised lens based on the measured optical characteristics, wherein the evaluating corrective optical system is prepared to have an aberration that, when optically combined with the restoration-premised lens in the composite optical system, cancels a designed aberration owned by the restoration-premised lens according to the design of the restoration-premised lens such that the measured optical characteristics represent residual aberration owned by the restoration-premised lens not according to the design.

2. The method according to claim 1, wherein said optical characteristics comprise one or more of image quality, lens specifications, modular transfer function (MTF), focal length, back-focus, F number, relative illuminations, distortion, chromatic aberration, and wavefront aberration.

3. The method according to claim 1, wherein the restoration-premised lens forms a blur image at an image forming position.

4. The method according to claim 1, wherein evaluating the restoration-premised lens further comprises comparing the measured optical characteristics with optical characteristics of the design to determining a degree to which the measured optical characteristics are near the design optical characteristics.

5. The method according to claim 3, wherein the restoration-premised lens is an aberration additional type lens.

6. The method according to claim 4, further comprising determining whether the degree is within a predetermined allowance range.

7. An apparatus for evaluating a restoration-premised lens which is employed in an image forming system that (i) converts an optical image into an electronic image and (ii) enforces a restoration processing on the electronic image in order to obtain a sharp image, wherein the restoration-premised lens is manufactured according to a design such that the restoration processing is to be enforced on the electronic image, the apparatus comprising:

an evaluating corrective optical system designed according to the known design of the restoration premised lens that, when combined with the restoration-premised lens according to the design, forms a sharp optical image;

a measuring section that measures optical characteristics of a composite optical system that includes the evaluating corrective optical system and the restoration-premised lens; and, an evaluating section that evaluates the restoration-premised lens based on the measured optical characteristics obtained by the measuring section, wherein the evaluating corrective optical system is prepared to have an aberration that, when optically combined with the restoration-premised lens in the composite optical system, cancels a designed aberration owned by the restoration-premised lens according to the design of the restoration-premised lens such that the measured optical characteristics represent residual aberration owned by the restoration-premised lens not according to the design.

8. The apparatus according to claim 7, wherein said optical characteristics comprise one or more of image quality, lens specifications, modular transfer function (MTF), focal length, back-focus, F number, relative illuminations, distortion, chromatic aberration, and wavefront aberration.

9. The apparatus according to claim 7, wherein the restoration-premised lens forms a blur image at an image forming position.

10. The apparatus according to claim 7, wherein the evaluating section compares the measured result with optical characteristics of the design to determine a degree to which the measured result is near the design optical characteristics.

11. The apparatus according to claim 9, wherein the restoration-premised lens is an aberration additional type lens.

12. The apparatus according to claim 10, wherein the evaluating section further determines whether the degree is within a predetermined allowance range.

13. An evaluating corrective optical system for evaluating a restoration-premised lens which is employed in an image forming system that (i) converts an optical image into an electronic image and (ii) enforces a restoration processing on the electronic image so as to obtain a sharp image, wherein the restoration-premised lens is manufactured according to a design such that the restoration processing is to be enforced on the electronic image, and the evaluating corrective optical system is designed according to the known design of the restoration-premised lens such that the evaluating corrective optical system, when combined with the restoration-premised lens according to the design, forms a sharp optical image, wherein the evaluating corrective optical system is prepared to have an aberration that, when optically combined with the restoration-premised lens in a composite optical system, cancels a designed aberration owned by the restoration-premised lens according to the design of the restoration-premised lens such that measured optical characteristics of the composite optical system represent residual aberration owned by the restoration-premised lens not according to the design.

* * * * *